United States Patent [19]
Luehring

[11] Patent Number: 5,106,155
[45] Date of Patent: Apr. 21, 1992

[54] INFANT PROTECTIVE CUSHION SYSTEM FOR SHOPPING CARTS

[76] Inventor: Barbara B. Luehring, 6355 Singletree Trail, Sarasota, Fla. 34241

[21] Appl. No.: 719,955

[22] Filed: Jun. 24, 1991

[51] Int. Cl.⁵ .............................................. A47D 1/10
[52] U.S. Cl. ................................. 297/250; 297/460; 297/DIG. 2
[58] Field of Search ............... 297/250, 229, 485, 460, 297/DIG. 1, DIG. 2; 280/33.99 B

[56] References Cited

U.S. PATENT DOCUMENTS

| | | | |
|---|---|---|---|
| 3,517,963 | 6/1970 | Woods et al. | 297/229 X |
| 3,578,380 | 5/1971 | Jacobus | 297/229 |
| 4,324,430 | 4/1982 | Dimas et al. | 297/250 |
| 4,598,945 | 7/1986 | Hopkins | 297/250 |
| 4,627,659 | 12/1986 | Hall | 297/485 X |
| 4,637,622 | 1/1987 | Burgard | 297/485 X |
| 4,666,207 | 5/1987 | Quartano | 297/250 X |
| 4,753,482 | 6/1988 | Warren | 297/460 X |

FOREIGN PATENT DOCUMENTS

3108997 11/1982 Fed. Rep. of Germany ...... 297/229

Primary Examiner—Peter A. Aschenbrenner
Attorney, Agent, or Firm—Dominik, Stein, Saccocio Reese, Colitz & VanDerWall

[57] ABSTRACT

A cushion system adapted for the comfortable and convenient supporting of a child in the mini-basket of a shopping cart comprising a back cushion having a central part and forwardly extending side parts positioned with its rear surface against the rear portion of the mini-basket, its lower middle surface on the seat of the mini-basket, and its lower forward surface on the forward portion of the mini-basket, and with an essentially 90 degree angle between the lower rear surface and the lower middle surface and with an arcuate portion on the upper surface generally perpendicular to the lower middle surface for receiving the back of a child; and a front cushion extending from side to side between the side parts of the back cushion and with a trapezoidal cross sectional configuration, the larger parallel face extending upwardly and with the shorter parallel face resting on the mini-basket seat.

11 Claims, 5 Drawing Sheets

INFANT PROTECTIVE CUSHION SYSTEM FOR SHOPPING CARTS

BACKGROUND OF THE INVENTION

1. Field of the Invention

This invention relates to an infant protective cushion system for shopping carts and, more particularly, to a pair of cushions positionable in the rear mini-basket portion of a shopping cart adapted to support a child in a comfortable and convenient orientation.

2. Description of the Background Art

All mothers know that tending a child is a time consuming and frequently difficult activity. Shopping is a task which requires time and attention of all, including mothers. When a mother must tend to a young child while shopping, the tasks of shopping and child tending seem to complicate each other. In order to abate such problem, various techniques have been proposed for the safe, secure, comfortable and convenient supporting of children while shopping. All such techniques, however, are deficient in one aspect or the other.

A wide variety of techniques are employed commercially or are disclosed in the patent literature in an effort to support a child in a shopping cart while the mother shops. Note for example U.S Pat. No. 4,324,430 to Dimas; U.S. Pat. No. 4,655,502 to Houllis; U.S. Pat. No. 4,674,758 to Valley and U.S. Pat. No. 4,877,289 to Herrera. All of these patents relate to devices for securing a child in a shopping cart. Such devices suffer from one problem or another. In the Dimas and Houllis devices, separate straps are required for securing the child into the seat. This can cause complications and inconvenience to the mother and pose a safety hazard to the child. In Houllis and Valley, the child is oriented so that he or she is facing away from the mother pushing the cart. This is an inconvenience to the mother when attempting to concurrently shop and tend the child. Further, in all instances, these devices are relatively complex and expensive and are also relatively difficult to utilize.

In another set of patents, child car seats are disclosed for particular use in automobiles where saftey is the principle concern. This grouping of patents includes U.S. Pat. No. 4,155,591 to Mauron; U.S. Pat. No. 4,754,999 to Kain; U.S. Pat. No. 4,765,685 to Sudoh; U.S. Pat. No. 4,854,639 to Burleigh and U.S. Pat. No. 4,984,849 to Rist. All of these child car seats are characterized by complex strap arrangements, and they are also multi-component systems. These factors render them difficult to construct as well as to utilize. They are also of high cost and are not particularly adapted for the safe, secure and convenient use by mothers shopping with a small child in a shopping cart.

The last prior art patent of interest is U.S. Pat. No. 4,631,766 to Semmler. This patent relates to a one-piece cushion anatomically configured for supporting a low birth weight infant in such a manner as to prevent most cushion-induced deformations from occuring. Although designed for the comfort and security of a child, such device is not configured for being positioned in association with a shopping cart. Further, such device is not constructed for supporting children beyond very small sizes and weights.

As illustrated by the large number of background art and commercial devices, efforts are continuously being made in an attempt to improve shopping cart devices for supporting children. No prior effort, however, suggests a present inventive combination of component elements arranged and configured as disclosed herein. Prior art shopping cart seats and cushions do not provide the benefits attendant with the present invention. The present invention achieves its purposes, objects and advantages over the prior art through a new, useful and unobvious combination of component elements, through the use of a minimum number of functioning parts, and through the use of only readily available materials and conventional components.

It is, therefore, an object of the present invention to provide a cushion system adapted for the comfortable and convenient supporting of a child in the mini-basket of a shopping cart comprising a back cushion having a central part and forwardly extending side parts positioned with its rear surface against the rear portion of the mini-basket, its lower middle surface on the seat of the mini-basket, and its lower forward surface on the forward portion of the mini-basket, and with an essentially 90 degree angle between the lower rear surface and the lower middle surface and with an arcuate portion on the upper surface generally perpendicular to the lower middle surface for receiving the back of a child; and a front cushion extending from side to side between the side parts of the back cushion and with a trapezoidal cross sectional configuration, the larger parallel face extending upwardly and with the shorter parallel face resting on the mini-basket seat.

It is a further object of the present invention to support a child in a comfortable and convenient manner while in a shopping cart.

It is a further object of the present invention to ease the burden of a mother tending a child while shopping.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a cushion system adapted for the comfortable and convenient supporting of a child in the mini-basket of a shopping cart comprising a back cushion having a central part and forwardly extending side parts positioned with its rear surface against the rear portion of the mini-basket, its lower middle surface on the seat of the mini-basket, and its lower forward surface on the forward portion of the mini-basket, and with an essentially 90 degree angle between the lower rear surface and the lower middle surface and with an arcuate portion on the upper surface generally perpendicular to the lower middle surface for receiving the back of a child; and a front cushion extending from side to side between the side parts of the back cushion and with a trapezoidal cross sectional configuration, the larger parallel face extending upwardly and with the shorter parallel face resting on the mini-basket seat.

The lower middle surface and lower forward surface may form an angle of about 110 degrees or about 90 degrees. The cushions are formed of an internal resilient material covered with fabric. The internal material may be a closed cell foam elastomer, preferably polyurethane or it may be a batting, preferably a polyester or it may be a polyurethane covered with a batting of polyester. The fabric may be knit from yarns and coated with a closed cell polymer or it may be woven or it may be a terrycloth.

The invention may also be incorporated into a cushion adapted for the comfortable and convenient supporting of a child in the mini-basket of a shopping cart comprising a back cushion having a central part and forwardly extending side parts positioned with its rear surface against the rear portion of the mini-basket, its lower middle surface on the seat of the mini-basket, and its lower forward surface on the forward portion of the mini-basket, and with an essentially 90 degree angle between the lower rear surface and the lower middle surface and with the lower middle surface and lower forward surface forming an angle of about 110 degrees and with an arcuate portion on the upper surface for receiving the back of a child; and a front cushion extending from side to side between the side parts of the back cushion and with a trapezoidal cross sectional configuration, the larger parallel face extending upwardly and with the shorter parallel face resting on the mini-basket seat.

Lastly, the invention may be incorporated into a cushion adapted for the comfortable and convenient supporting of a child in the mini-basket of a shopping cart comprising a back cushion having a central part and forwardly extending side parts positioned with its rear surface against the rear portion of the mini-basket, its lower middle surface on the seat of the mini-basket, and its lower forward surface on the forward portion of the mini-basket, and with an essentially 90 degree angle between the lower rear surface and the lower middle surface and with an arcuate portion on the upper surface for receiving the back of a child.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENTS

Figure 1:
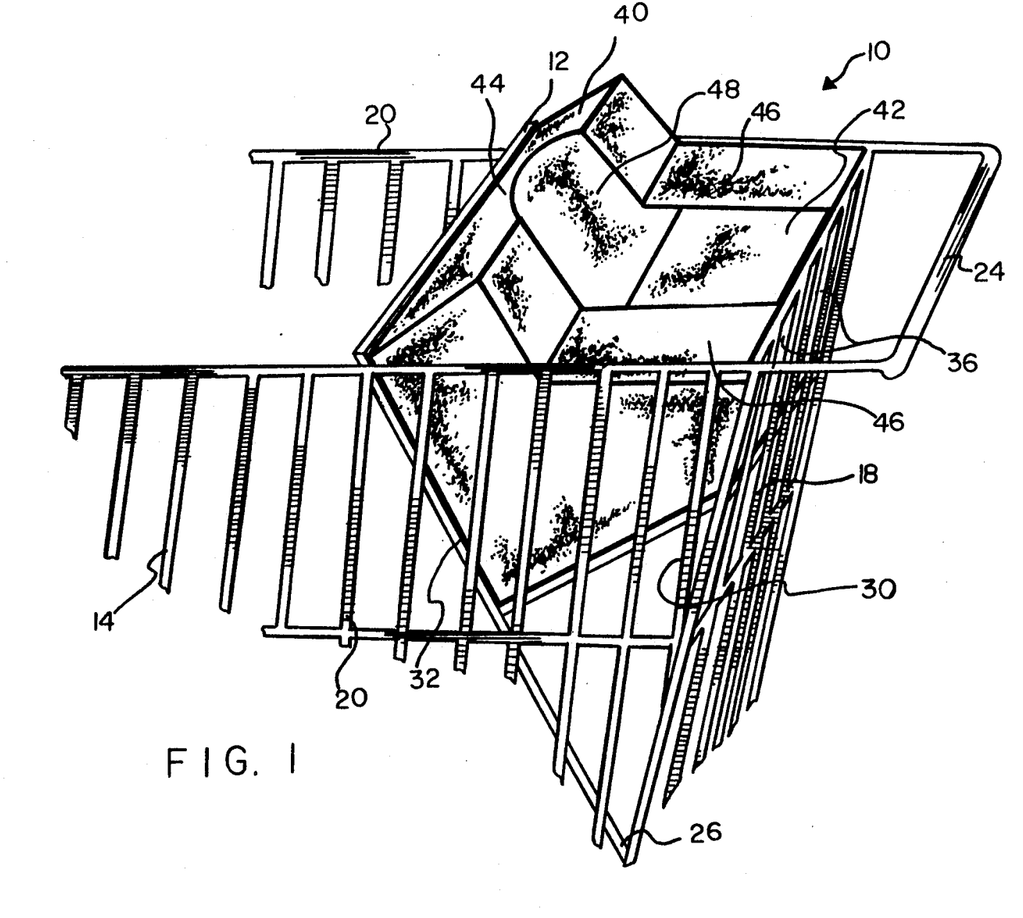
FIG. 1 is a perspective illustration of a portion of a shopping cart receiving and supporting a protective cushion system constructed in accordance with the principles of the present invention.
Figures 2, 3:
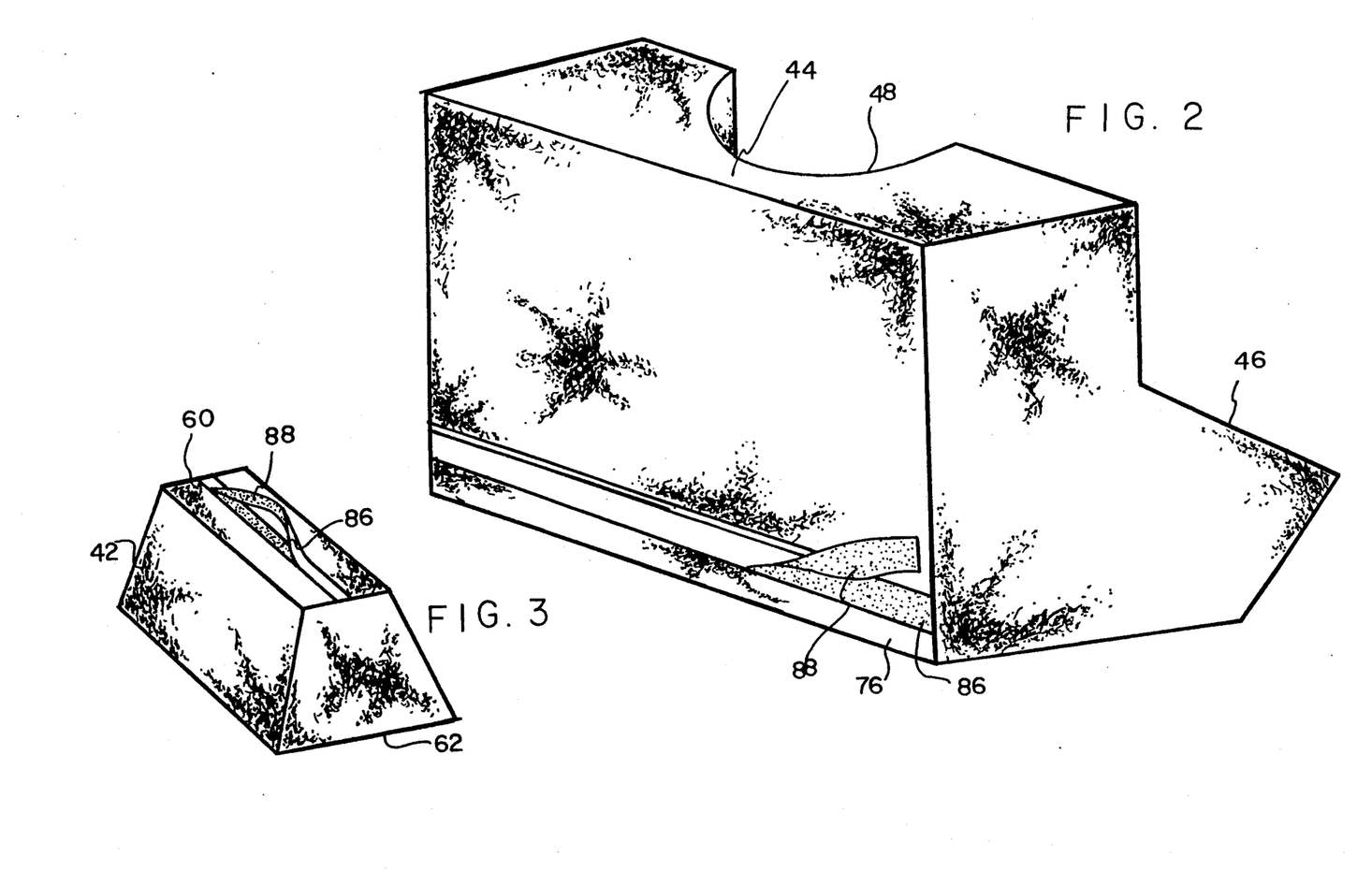
FIG. 2 is a perspective illustration of the back cushion shown in FIG. 1 constructed in accordance with the principles of the present invention.
FIG. 3 is a perspective illustration of the front cushion as shown in FIG. 1 constructed in accordance with the principles of the present invention.
Figure 4:
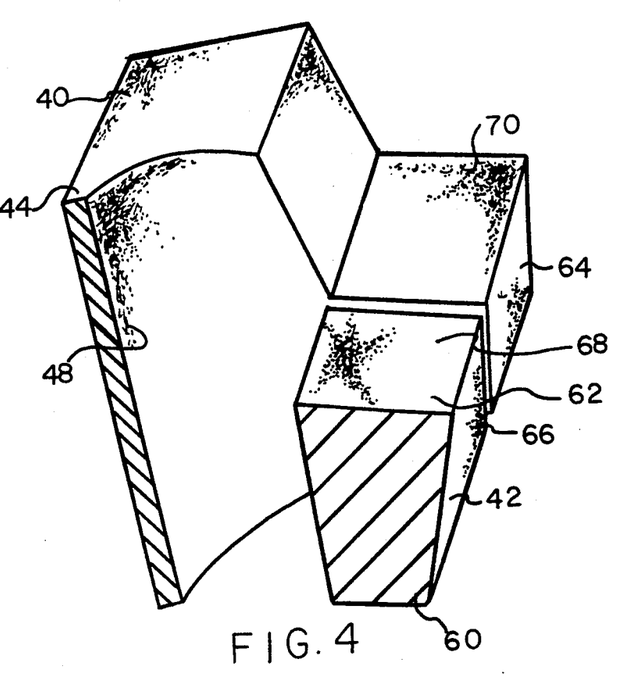
FIG. 4 is a partial sectional view of the back and front cushions shown in FIGS. 1 through 3.

Shown in FIG. 1 is a perspective illustration of the protective system of pillows or cushions constructed in accordance with the principle invention. It is shown located in the rear mini-basket portion 12 of a shopping cart 14.

Figure 5:
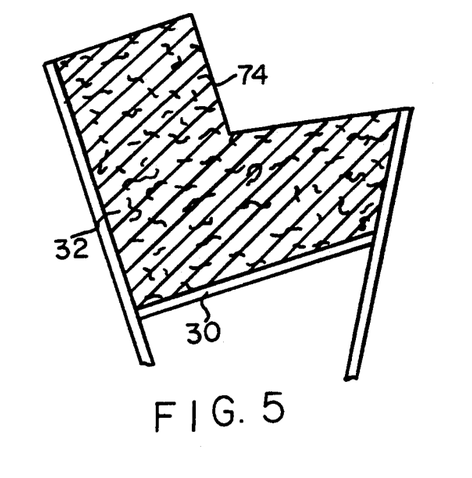
FIG. 5 is a sectional view of the back cushion shown in the prior Figures but situated in the mini-basket of a shopping cart.

By way of background, shopping carts 14 are generally fabricated of a wire frame construction with front and rear walls 18, side walls 20, a bottom and an open top through which groceries are placed in the forward end during shopping prior to check-out. The cart 14 is supported on wheels and has a handle 24 for the shopper at the rear end at the rear wall. Also located adjacent to the rear end is a mini-basket 12. The mini-basket is normally in a closed orientation, not shown, in parallel contact with the rear wall 18 of the shopping cart. It may, however, be pivoted forward about a hinge 26 at its lower end into an open orientation spaced from the rear wall. Note FIGS. 1 and 5. Also in association the mini basket is a lower wall or seat 30 pivotal with respect to the rear wall. The mini-basket thus has side walls 20 and a rear wall 18 which are also part of the shopping cart. It also has its own forward wall 32 and seat 30 as well as an open top. The seat 30 of the mini-basket is generally of plastic and imperforate to constitute a surface for a seated child while accompanying the mother during shopping. When using such mini-basket as a seat, the child's back is away from the mother and the feet extend through openings 36 in the rear wall 18. The child is thus facing the mother for greatest safety, security, comfort and convenience.

As discussed above, various mechanisms have been described for safely retaining smaller children in mini-baskets. The present invention contemplates the use of a protective cushion system 10 specifically configured on its side and lower surfaces for being securely received within the mini-basket 12 and with an upper surface specifically configured for receiving the child.

The protective cushion system is formed of two parts, a major or back cushion 40 and a minor or front cushion 42. The major or back cushion includes a central part 44 and two side parts 46. The central part 44 has a curved section 48, with its axis perpendicular to the seat, for receiving the back and head of the infant to be supported thereby. The central section extends upwardly above the forward wall of the minibasket so the child will not hit its head on the metal wall. The lower surface of the main cushion has a central flat surface portion 52 extending at a slight angle from the horizontal. It also has a forward flat surface portion 54 at right angles with respect to the central flat portion 52. These surface portions normally rest on the seat 30 and front wall 18 of the mini-basket which are normally at about right angles with respect to each other. The seat is normally at an angle slightly offset from the horizontal, about 25 degrees, being lower at the forward end. At the rear end of the seat, the rear wall 18 and rear flat surface portion 56 of the back cushion extend angularly upwardly at about 145 degrees from the plane of the seat and lower surface of the central flat portion 52. This is to allow the forward flat portion of the back cushion to rest upon the rear wall of the basket and mini-basket.

Positioned within the mini-basket, between the side parts 46, is the minor or front cushion 42. This cushion extends from side to side a distance equal to that between the side parts 46 of the back cushion of the system. The front cushion is formed with a trapezoidal cross sectional configuration with its short parallel face 60 adapted to be positioned over the legs of the child and resting against the back of the mini-basket. In this manner, the child can be supported with its bottom resting on the seat of the mini-basket, and with its back in the curved section of the back cushion and prevented from forward movement by the front cushion. Lateral movement of the child is abated by the curvature of the main cushion and side sections.

When positioned together for operation and use, the rearward-most surfaces 64 and 66 of the back cushion and front cushion are coplanar. Further, the uppermost surface of the front cushion 68 is also coplanar with the uppermost surface 70 of the side parts of the back cushion.

The two cushions of the system are preferably fabricated of a soft resilient material 74 interiorly with cut and stitched material 76 exteriorly. The interior may be molded to shape or first molded and then cut to shape. The interior material is preferably a synthetic elastomer such as a closed cell polyurethane foam or the like. Other elastomeric materials could readily be utilized such as a soft rubber, natural or synthetic, or blends thereof.

Figure 8:
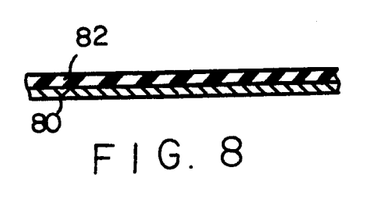
FIGS. 8, 9 and 10 are partial sectional views of the fabric for the pillows shown in the prior Figures.

The exterior is preferably formed of a sheet material 76. A preferred sheet material is a fabric 80 knit from a synthetic yarn such as nylon with an exterior layer 82 of an elastomer calendared onto the exterior surface to form a laminate. The calendared material is preferably vinyl or a closed cell polyurethane foam. Note FIG. 8.

The sheet material is cut to shape with end pieces and a central piece which are stitched at their edges into a configuration to make a covering for the interior member. For both cushions, a closure 86 and 88 extends from side to side. The closure of each cushion is located near the bottom thereof. This allows the interior member to be removed from the covering for the washing of the covering.

Figure 6:
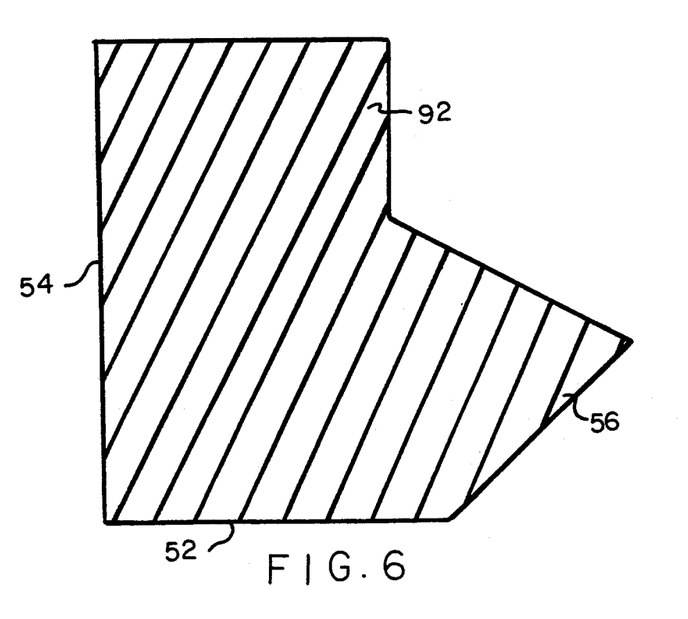
FIGS. 6 and 7 are sectional views of alternate constructions for the back pillow shown in the prior Figures.

FIG. 6 shows an alternate embodiment wherein the interior material is simply formed of a batting 92, synthetic yarns pressed together to form a soft, resilient mass. A preferred material for the batting yarn is polyester.

Figure 7:
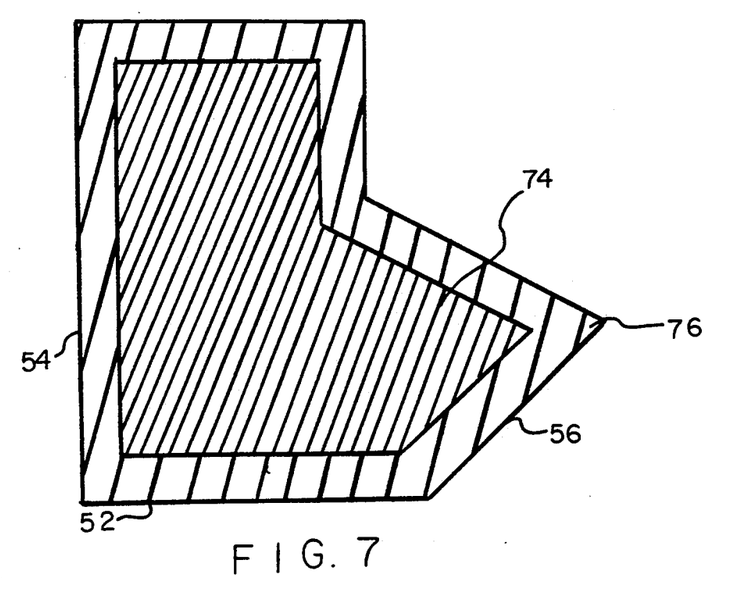

In FIG. 7, the interior member is formed of a elastomeric foam 74 as in the first embodiment but of a smaller size. Batting material 92 of the type in FIG. 6 embodiment is then formed as a layer around the foam to make a two-component internal member.

Figure 9:
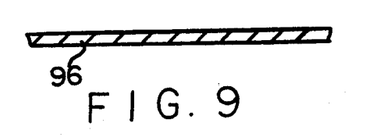
Figure 10:
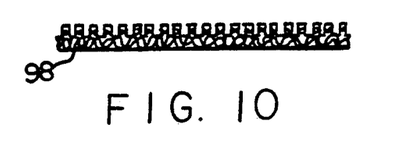

Also in FIG. 9, note is taken that a simple woven fabric 96 is utilized rather than the two-component fabric laminate as in the first embodiment. In the FIG. 10 embodiment, the exterior member is formed as a pile-type fabric 98 such as terrycloth with a woven base and piles extending outwardly therefrom. Any of the various internal constructions could be used with any of the external sheet materials.

Figure 11:
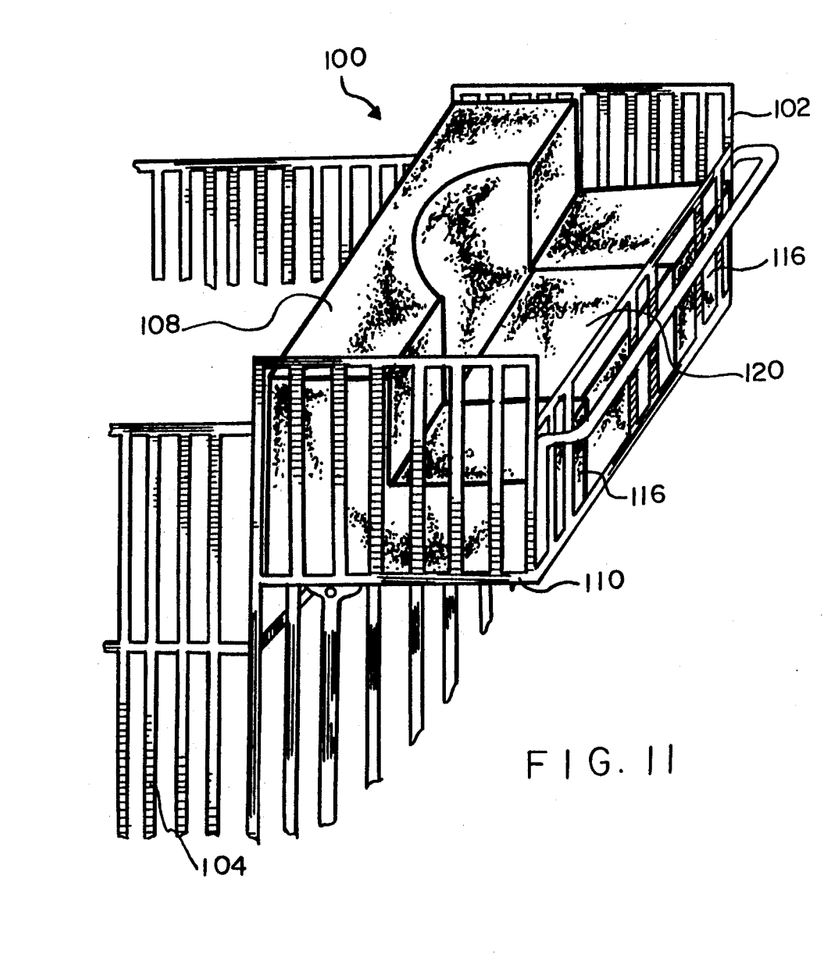
FIG. 11 is a perspective illustration of a cushion system, back cushion and front cushion, shown in a mini-basket and constructed in accordance with an alternate embodiment of the invention.
Figure 12:
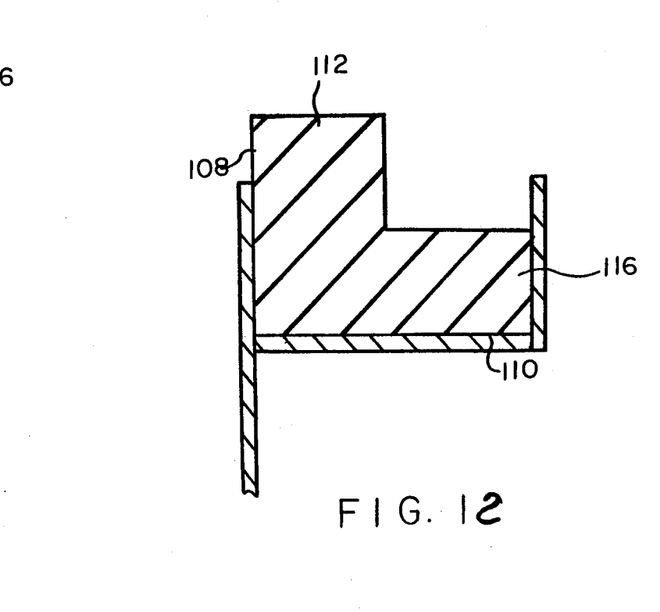
FIG. 12 is a sectional view of the back cushion shown in FIG. 11.

In FIGS. 11 and 12, there is shown a cushion system 100 constructed in accordance with a further alternate embodiment of the invention. This embodiment is required due to alternate constructions of shopping carts 104 and their mini-baskets 102, alternate constructions which are different from the more common configuration as shown in FIGS. 1 through 10. In this alternate embodiment, the shopping cart 104 is formed in a nearly rectangular configuration for all of its walls and seat. As a result, the back and bottom surfaces 108 and 110 of the back cushion 112 of the cushion system are at right angles with respect to each other. The lower forward surface 116 of the back cushion 112 is formed parallel with the rear wall of the mini-basket. Similarly, the front cushion 120 has a rectangular cross section.

The comfort and convenience of the first embodiment are attained in the second embodiment by very minor changes of shape and construction. And as in the first embodiment of FIGS. 1 through 10, the second embodiment may be constructed of any of the materials or combinations thereof.

It has been found that the cushion system of the present invention may readily be used by most children from ages 2 through 12 months or from weights of 8 to 25 pounds. Further, for most children from ages 8 through 15 months or from weights of 20 to 30 pounds, the back cushion may be used without the front cushion. Hence the utility of the present invention is extended by the use of the back cushion alone in the mini-basket independent of the front cushion.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Now that the invention has been described,

What is claimed is:

1. A cushion system adapted for the comfortable and convenient supporting of a child in the mini-basket of a shopping cart, the mini-basket having a rear portion, a seat and a forward portion, the cushion system comprising:

a back cushion having a central part and rearwardly extending side parts, the back cushion having a rear surface positionable against the rear portion of the mini-basket, the back cushion having a lower middle surface positionable on the seat of the mini-basket, and the back cushion having a lower forward surface positionable against the forward portion of the mini-basket, and with an essentially 90 degree angle between the rear surface and the lower middle surface and with the back cushion having an upper surface with an accurate portion generally perpendicular to the lower middle surface for receiving the back of a child; and a front cushion extending from side to side between the side parts of the back cushion and with a trapezoidal cross sectional configuration, the larger parallel face extending upwardly to a location coplanar with the upper surfaces of the side part and with the shorter parallel face positionable on the mini-basket seat at a location coplanar with the lower surfaces of the side parts.

2. The system as set forth in claim 1 wherein the lower middle surface and lower forward surface form an angle of about 110 degrees.

3. The system as set forth in claim 1 wherein the cushions are formed of an internal resilient material covered with fabric.

4. The system as set forth in claim 3 wherein the internal material is a closed cell foam elastomer.

5. The system as set forth in claim 4 wherein the foam is a closed cell polyurethane.

6. The system as set forth in claim 3 wherein the internal material is batting.

7. The system as set forth in claim 6 wherein the batting is a polyester.

8. The system as set forth in claim 3 wherein the internal material is polyurethane covered with a batting of polyester.

9. The system as set forth in claim 3 wherein the fabric is knit from yarns and coated with a closed cell polymer.

10. The system as set forth in claim 8 wherein the fabric is woven.

11. The system as set forth in claim 10 wherein the woven fabric is a terrycloth.

* * * * *

UNITED STATES PATENT AND TRADEMARK OFFICE
CERTIFICATE OF CORRECTION

PATENT NO. : 5,106,155
DATED : April 21, 1992
INVENTOR(S) : Barbara B. Luehring

It is certified that error appears in the above—identified patent and that said Letters Patent is hereby corrected as shown below:

In column 6, line 66, change "rear" to --forward--.

In column 7, line 2, change "forward" to --rear--.

In column 7, line 10, before "side" insert --inner surfaces of the--.

In column 7, line 14, change "on" to --above--.

In column 7, line 15, change "coplanar with" to --adjacent to--.

In column 7, line 16, change "lower" to --inner--.

Signed and Sealed this

Fifteenth Day of June, 1993

Attest:

MICHAEL K. KIRK

Attesting Officer

Acting Commissioner of Patents and Trademarks